(12) United States Patent
Panayotov

(10) Patent No.: US 7,349,940 B1
(45) Date of Patent: Mar. 25, 2008

(54) COMMUNICATION PROTOCOL FOR DATA EXCHANGE VIA SHARED FILES

(75) Inventor: Valentin Panayotov, Sinking Spring, PA (US)

(73) Assignee: Agere Systems Inc., Allentown, PA (US)

( * ) Notice: Subject to any disclaimer, the term of this patent is extended or adjusted under 35 U.S.C. 154(b) by 1712 days.

(21) Appl. No.: 09/705,578

(22) Filed: Nov. 3, 2000

(51) Int. Cl.
*G06F 15/16* (2006.01)
*G06F 12/00* (2006.01)
*H04L 12/28* (2006.01)
*G04F 15/167* (2006.01)
*G06G 13/00* (2006.01)

(52) U.S. Cl. .............. 709/201; 707/201; 370/254; 709/213; 709/228; 710/31

(58) Field of Classification Search ............... 707/201, 707/203, 10; 719/328; 370/254; 709/201, 709/213, 228
See application file for complete search history.

(56) References Cited

U.S. PATENT DOCUMENTS

| | | | |
|---|---|---|---|
| 5,729,735 A | 3/1998 | Meyering | 395/610 |
| 5,737,738 A | 4/1998 | Sharman | 707/201 |
| 5,794,229 A | 8/1998 | French et al. | 707/2 |
| 5,799,305 A | 8/1998 | Bortvedt et al. | 704/10 |
| 5,806,065 A | 9/1998 | Lomet | 707/8 |
| 5,813,017 A | 9/1998 | Morris | 707/204 |
| 5,832,508 A | 11/1998 | Sherman et al. | 707/200 |
| 5,832,515 A | 11/1998 | Ledain et al. | 707/202 |
| 5,845,282 A * | 12/1998 | Alley et al. | 707/10 |
| 5,878,414 A | 3/1999 | Hsiao et al. | 707/8 |
| 5,907,848 A | 5/1999 | Zaiken et al. | 707/202 |
| 5,913,213 A | 6/1999 | Wikström et al. | 707/8 |
| 5,944,789 A | 8/1999 | Tzelnic et al. | 709/214 |
| 5,953,728 A | 9/1999 | Horowitz et al. | 707/202 |
| 5,966,706 A | 10/1999 | Biliris et al. | 707/10 |
| 5,966,707 A | 10/1999 | Van Huben et al. | 707/10 |
| 5,987,477 A | 11/1999 | Schmuck et al. | 707/201 |
| 6,038,563 A | 3/2000 | Bapat et al. | 707/10 |
| 6,061,683 A | 5/2000 | Alonso | 707/8 |
| 6,611,849 B1 * | 8/2003 | Raff et al. | 707/203 |
| 6,633,924 B1 * | 10/2003 | Wu et al. | 719/328 |
| 6,671,700 B1 * | 12/2003 | Creemer et al. | 707/201 |

OTHER PUBLICATIONS

Russo, Mark I. and Echols, Martin M., *Automated Science and Engineering Laboratories With Visual Basic*, Wiley & Son, Inc., 1999, Chapter 13, "File Communications," pp. 127-136.

* cited by examiner

Primary Examiner—John Follansbee
Assistant Examiner—Karen C Tang

(57) ABSTRACT

A system and associated method of exchanging data between a first and second computer application of a computer system. Data originating from the first computer application is written to a first computer application data file. A first computer application send file is notified when data has been written to the first computer application data file by the first computer application. The first computer application send file is monitored from the second computer application for notification when data has been written to the first computer application data file by the first computer application. The data of the first computer application data file is read from the second computer application upon detection of notification. A first computer application read file is notified that data has been read by the second computer application from the first computer application data file.

10 Claims, 1 Drawing Sheet

COMMUNICATION PROTOCOL FOR DATA EXCHANGE VIA SHARED FILES

BACKGROUND OF THE INVENTION

The invention relates to data exchange between computer applications. More particularly, the invention relates to the exchange of data between application level shared files to establish a communication protocol between two computer applications.

Computer technology has fostered the development of computer software applications which have become integral components of commercial as well as personal computing systems. As such, the need for computers supporting common applications to exchange data has resulted in a proliferation of network technologies and communication standards and protocols. These technologies typically address the management of dissimilar physical, link and network layers of the OSI (Open Systems Interconnection) model, for the purpose of establishing a viable communication medium between applications and computing devices.

For example, data exchange between computer applications may include, (i) computer control and data acquisition of automated equipment data, followed by (ii) processing of the acquired data, and finally by (iii) archiving/export to a database. Presently, any of these functions can be performed by individual computer applications. However, for continuous operation, the separate computer applications must be simultaneously running (preferably on a single machine) and freely exchanging data with each other. Since real-time communication between two computer applications is often impractical (except for the case when they happen to be from the same generation of the same manufacturer) more often than not, a single computer application has to be developed having all of the above functionality; This is a very costly, time consuming, and an entirely non-portable solution.

Some industry organizations have established standards and protocols to further enhance data communication capabilities. For example, the Semiconductor Equipment and Materials International (SEMI) trade association has introduced standards such as SEMI E4 (SEMI Equipment Communications Standard 1 Message Transfer—SECS-I), SEMI E5 (SEMI Equipment Communications Standard 2 Message Content—SECS-II), SEMI E30 (Generic Model for Communications and Control of Manufacturing Equipment—GEM), SEMI E37 (High-Speed SECS Message Services Generic Services—HSMS). These standards specify strict message (data) formats for communication over a dedicated hardware line (RS 232 serial connection or a TCP/IP stream support). However, the standards (i) pertain only to the particular case of data exchange between a piece of semiconductor equipment and a host computer, (ii) require additional hardware connectivity, and (iii) require very expensive, often proprietary, and generally non-portable software and hardware development.

Accordingly, there is a need for a simple communication protocol in which a broad range of computer applications can communicate with each other.

SUMMARY OF THE INVENTION

The present invention is a system and associated method of exchanging data between a first and second computer application of a computer system. A computer application data file receives data from the first computer application. A computer application send file receives notification when the computer application data file has received data from the first computer application. A computer application read file receives notification when data has been read from the computer application data file by the second computer application. The first computer application monitors the computer application read file for notification from the second computer application to initiate further writing to the computer application data file.

According to one aspect of the invention, a computing system for exchanging data between computer applications of the system is provided. A computer application data file for each computer application receives data from a corresponding one of the computer applications. A computer application send file corresponding to each computer application data file receives notification that the corresponding computer application data file has received data from the corresponding one of the computer applications. A computer application read file corresponding to each computer application data file receives notification that data has been read from the computer application data file by a non-corresponding computer application. The corresponding computer application monitors the computer application read file for notification to initiate further writing to the corresponding computer application data file.

According to another aspect of the invention, data originating from the first computer application is written to a first computer application data file. A first computer application send file is notified when data has been written to the first computer application data file by the first computer application. The first computer application send file is monitored from the second computer application for notification that data has been written to the first computer application data file by the first computer application. The data of the first computer application data file is read from the second computer application upon notification. A first computer application read file is notified when data has been read by the second computer application from the first computer application data file.

According to still another aspect of the invention, a system and associated method of exchanging bi-directional data between a first and second computer application of a computer system is provided. Data originating from the second computer application is written to a second computer application data file. A second computer application send file is notified when data has been written to the second computer application data file by the second computer application. The second computer application send file is monitored from the first computer application for notification that data has been written to the second computer application data file by the second computer application. The data of the second computer application data file is read from the first computer application upon notification. The second computer application read file is notified when data has been read by the first computer application from the second computer application data file.

BRIEF DESCRIPTION OF THE SEVERAL VIEWS OF THE DRAWINGS

The foregoing summary as well as the following detailed description of exemplary embodiments of the invention, will be better understood when read in conjunction with the appended drawing. For the purpose of illustrating the invention, there is shown in the drawing an exemplary embodiment of the invention. It should be understood, however, that the invention is not limited to the precise arrangement and instrumentality shown. In the drawing.

DETAILED DESCRIPTION OF THE INVENTION

Figure 1:
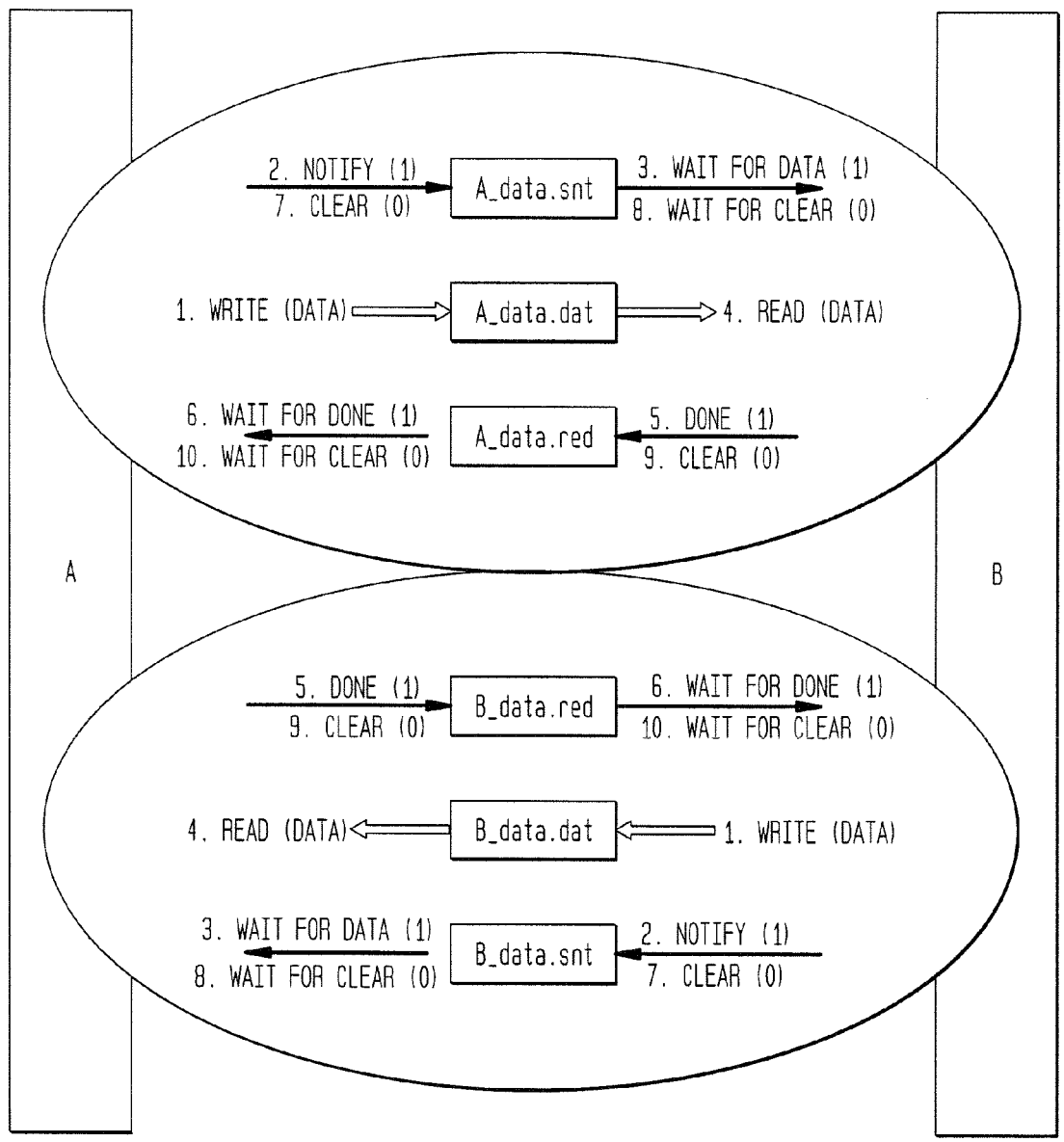
FIG. 1 is a block diagram of an embodiment of a preferred communication flow architecture of the present invention.

Certain terminology is used herein for convenience only and is not to be taken as a limitation on the present invention. The term "computer application" is defined as any a set of instructions, specific for a given microprocessor, that when executed by that microprocessor will specify a valid sequence of predefined operations. The term "communication protocol" is defined as a sequence of states and events that specify the procedure of exchange of information at the application level between two computer applications. The term "communication link" is defined as the one-directional connection between two computer applications where one application is the source of the data and the other the destination for the data.

A portion of this patent document contains material which is subject to copyright protection. The owner has no objection to the facsimile reproduction by anyone of the patent document or patent disclosure as it appears in the Patent and Trademark Office patent file records, but otherwise reserves all rights whatsoever.

The present invention concerns a system and associated method for exchanging data between computer applications via shared file structures and a pre-defined flow sequence. The applications utilize basic input/output functionality. For each communication link, one data file and two notification files are used.

A computer application data file receives data from the first computer application. A computer application send file receives notification when the computer application data file has received data from the first computer application. A computer application read file receives notification when data has been read from the computer application data file by the second computer application. The first computer application monitors the computer application read file for notification from the second computer application to initiate further writing to the computer application data file.

The communication protocol described herein provides the necessary mechanism for synchronization and data validation. In addition, it inherently guards against sharing violations, since each computer application can simultaneously write or "talk" and read or "listen", this is of utmost importance. As defined by most computer operating systems, a sharing violation is an attempt by two or more computer applications to simultaneously access a given file in a write mode or to operate on an otherwise protected file. A straightforward attempt for exchange of data between two computer applications via shared files will fail because of sharing violations. The present communication protocol allows only one of the applications to access a given file in a write mode. Monitoring of the notification files and following the indicated data flow sequence prevents access attempts to files that are currently used by the other application. An application level handshaking protocol is thus established that guarantees against sharing violations.

Referring now to FIG. 1, two computer applications A and B are shown for establishing a two-way or bi-directional communication. A set of three shared files in the familiar UNIX/DOS notation (i.e., A_data.*) are designated for transfer of data from computer application A to computer application B (top oblong circle). Another set of three files (B_data.*) are designated for transfer of data from application B to application A (bottom oblong circle). The computing system supporting applications A and B, and communicating with the data and communication files can be a single or "stand-alone" computing device (in a multitasking mode) or separate computing devices connected via an existing network (not shown). It is recognized by those skilled in the art that the present invention is not limited to UNIX/DOS operating systems and/or a particular computer application data format.

In general, for every additional communication link (i.e., oblong circle of FIG. 1) another set of notification and data files are used. For a meaningful communication to occur, the data exchange needs to be synchronized by the notification files. For example, the data exchange will fail if computer application B tries to read data before it is written by computer application A. The need for synchronization is a necessary requirement in the field of communications and communication protocols must specify the correct sequence of the data exchange events.

The data file designated "A_data.dat" in FIG. 1 will contain the actual computer application data being provided from computer application A for exchange to computer application B. The data may be any valid digital content. A will only write to the A_data.dat file and B will only read from the A_data.dat file.

The send notification file designated "A_data.snt" in FIG. 1 will contain a predefined pair of values (e.g., 1 and 0). The value will indicate whether valid data is present (1) or absent (0) in the A_data.dat file (i.e., whether or not application A has written data). Computer application A will only write to the send notification file A_data.snt and computer application B will only read from the send notification file A_data.snt.

The read notification file designated "A_data.red" in FIG. 1 will contain a predefined pair of values (e.g., 1 or 0). The value will indicate whether data has been successfully read (1) or not (0) from the data file. Computer application A will only read from the read notification file A_data.red and computer application B will only write to the read notification file A_data.red.

Using the above set of communication files, the following minimum set of events can define a valid data transfer of data from application A to application B:

1. Computer application A "writes" data to the data file A_data.dat.
2. Computer application A notifies computer application B that data is present in the data file by writing a value to file A_data.snt.
3. Computer application B "reads" data from the data file A_data.dat.
4. Computer application B notifies computer application A through the notification file that the data has been read from the data file by writing a value to file A_data.red.

The above sequence may need to be refined and expanded if the particular operating system that hosts the data and notification files places additional restrictions on sharing and timing access.

The following detailed list of the states (of both applications and communication files) and events defines the communication protocol for data transfer from application A to application B. This is a single communication link utilizing three shared files (top oblong circle on FIG. 1). Bi-directional data exchange would be the simultaneous operation of (2) two such data links and six shared files (top and bottom oblong circles in FIG. 1)

Initialization

At start up, before any data transfer is initiated, the initial/stand-by states of the communication files should be set to the following:

Data Transfer

For a single data transfer in this communication link the following sequence is defined:

TABLE 1

| | Application A | Application B |
|---|---|---|
| 1. | Writes data to the A_dat.dat file. | Idle state - waits for a "valid data present" indication in the A_data.snt send notification file. |
| 2. | Writes a "valid data present" indication to the A_data.snt send notification file. Enters idle state. | Idle state - waits for a "valid data present" indication in the A_data.snt send notification file. |
| 3. | Idle state - waits for a "successfully read" indication in the A_data.red read notification file. | Reads the "valid data present" indication from the A_data.snt send notification file. Exits idle state. |
| 4. | Idle state - waits for a "successfully read" indication in the A_data.red read notification file. | Reads the data from the A_data.dat data file. |
| 5. | Idle state - waits for a "successfully read" indication in the A_data.red read notification file. | Writes a "successfully read" indication to the A_data.red read notification file. Enters idle state. |
| 6. | Reads the "successfully read" indication from the A_data.red read notification file. Exits idle state. | Idle state - waits for a "clear/invalid data" indication in the Send Notification File. |
| 7. | Writes a "clear/invalid data" indication to the A_data.snt send notification file. Enters idle state. | Idle state - waits for a "clear/invalid data" indication in the A_data.snt send notification file. |
| 8. | Idle state - waits for a "clear/unsuccessfully read" indication in the A_data.red read notification file. | Reads the "clear/invalid data" indication from the A_data.snt send notification file. Exits idle state. |
| 9. | Idle state - waits for a "clear/unsuccessfully read" indication in the A_data.red read notification file. | Writes a "clear/unsuccessfully read" indication to the A_data.red read notification file. Enters idle state. |
| 10. | Reads the "clear/unsuccessfully read" indication from the A_data.red read notification file. Data transfer is over. Ready to initiate next transfer. | Idle state - waits for a "valid data present" indication in the A_data.snt send notification file. This is the stand-by state - transfer is over, waiting for next transfer. |

| | |
|---|---|
| Send Notification File | contains "clear/invalid data" |
| Read Notification File | contains "clear/unsuccessfully read" |
| Data File | irrelevant |

The initial states of the computer applications should be set to the following:

| | |
|---|---|
| Application A | Any state - ready to initiate the transfer. |
| Application B | Idle state - waits for a "valid data present" indication in the Send Notification File. |

The proper initialization procedure requires that application A write a "clear/invalid data" notification to the send notification file to ensure that any data that may be left over from prior communications is overwritten (this action will prevent B from reading any data that may be left over from prior communications in the Data File). Application B needs to write an "clear/unsuccessfully read" to the read notification file to ensure that any data that may be left over from prior communications be overwritten. The contents of the data file are irrelevant, previous data will not be inadvertently read and would be overwritten by the first data transfer.

At the end of this sequence all files are in their initial/stand-by state, application B is in a idle mode expecting application A to initiate the next data transfer.

The present invention enables the interface of computer applications running on dissimilar or remote computer systems connected over an existing network; interface of existing computer controlled equipment without the need for additional hardware connectivity; remote control of computer applications; and interface of computer applications from different software generations.

Commented source code of an embodiment of the communication protocol for data exchange via shared files follows below.

Visual Basic Implementation

The following is commented MICROSOFT® Visual Basic source code for implementing the functionality of the present invention. The commented sections in the code describe the calling sequences in detail. The implementation provides (i) automatic creation and consistent naming of all notification files in order to safeguard against inadvertent mis-configurations, (ii) an externally accessible variable for termination in case of communication error, and (iii) standard Visual Basic error trapping procedures, execution yielding, etc.

```
'----------------------------------------------------------------
' CP_Util.bas        Version 3.0
'
  ' Visual Basic V5.0 implementation of Communication Protocol
  ' for Data Exchange Via Shared Files
'
  ' For each data link, an application has to declare a file path and a
  ' communication link number. The application can be either a "data
' source" or a "data destination" in that link.
'
' For example, an application that will be a "data source"
' in a given link may be initialized with the following:
'
'    sPath = "C:\WINDOWS\TEMP\"
'    sLink = 712
'    Call CP_InitSend(sPath, sLink, sLinkFile, sDataFile)
'
' while the corresponding "data destination" application will be
' initialized with:
'
'    dPath = "C:\WINDOWS\TEMP\"
'    dLink = 712
'    Call CP_InitReceive(dPath, dLink, dLinkFile, dDataFile)
'
' Then for every transfer the "data source" application needs to
' execute the following code:
'
'    Call WriteData(sDataFile,Data)
'    Call CP_SendData(sLinkFile)
'
' The "data destination" application receives the data by executing:
'
'    Call CP_WaitForData(dLinkFile)
'    Call ReadData(dDataFile,Data)
'    Call CP_ReceiveData(dLinkFile)
'
' WriteData and ReadData may be any custom subroutines designed to
' write/read a compatible data format to/from the data file.
'----------------------------------------------------------------
' Option Explicit
'----- public variable providing for externally forced exit
Public CP_Abort As Boolean
'----- private constants defining communication role
Private Const CP_Source      As String = "0"
Private Const CP_Destination As String = "1"
'----- private constants defining flag contents
Private Const CP_OFF As Byte = 0
Private Const CP_ON As Byte = 1
'----------------------------------------------------------------
' Needs to be executed before the first sending operation
' (sets initial/stand-by state).
'----------------------------------------------------------------
Public Sub CP_InitSend(Path As String, _
                 Link As Integer, _
                 LinkFile As String, _
                 DataFile As String)
    CP_Abort = False
    LinkFile = Path + "Cpff" + Trim(Str(Link))
    Call CP_SendFlag(LinkFile, CP_Source, CP_OFF)
    DataFile = LinkFile + ".dat"
End Sub
'----------------------------------------------------------------
' Needs to be executed before the first receiving operation
' (sets initial/stand-by state).
'----------------------------------------------------------------
Public Sub CP_InitReceive(Path As String, _
                 Link As Integer, _
                 LinkFile As String, _
                 DataFile As String)
    CP_Abort = False
    LinkFile = Path + "Cpff" + Trim(Str(Link))
    Call CP_SendFlag(LinkFile, CP_Destination, CP_OFF)
    DataFile = LinkFile + ".dat"
End Sub
'----------------------------------------------------------------
' Handles the notifications after data is written to the Data File.
'----------------------------------------------------------------
Public Sub CP_SendData(LinkFile As String)
    Call CP_SendFlag(LinkFile, CP_Source, CP_ON)
```

-continued

```
    Call CP_ReceiveFlag(LinkFile, CP_Source, CP_ON)
    Call CP_SendFlag(LinkFile, CP_Source, CP_OFF)
    Call CP_ReceiveFlag(LinkFile, CP_Source, CP_OFF)
End Sub
'----------------------------------------------------------------
' Places in idle state while waiting for data.
'----------------------------------------------------------------
Public Sub CP_WaitForData(LinkFile As String)
    Call CP_ReceiveFlag(LinkFile, CP_Destination, CP_ON)
End Sub
'----------------------------------------------------------------
' Handles the notifications after data is read from the Data File.
'----------------------------------------------------------------
Public Sub CP_ReceiveData(LinkFile As String)
    Call CP_SendFlag(LinkFile, CP_Destination, CP_ON)
    Call CP_ReceiveFlag(LinkFile, CP_Destination, CP_OFF)
    Call CP_SendFlag(LinkFile, CP_Destination, CP_OFF)
End Sub
'----------------------------------------------------------------
' Sends a given flag to a given flag file.
' N.B. Source Roles write only to Source Files.
'      Destination Roles write only to Destination Files.
'----------------------------------------------------------------
Private Sub CP_SendFlag(LinkFile As String, _
                  Role As String, _
                  Flag As Byte)
    Dim Ext As String
    If CP_Abort = True Then Exit Sub
    If Role = CP_Source Then Ext = "." + CP_Source
    If Role = CP_Destination Then Ext = "." + CP_Destination
OpenAgain:
    On Error GoTo OpenError
    Open LinkFile + Ext For Output Access Write Shared As #1
    Write #1, Flag
    Close #1
    Exit Sub
OpenError:
    DoEvents
    If CP_Abort = True Then Exit Sub
    Resume OpenAgain
End Sub
'----------------------------------------------------------------
' Waits for a given flag to be in a given flag file.
' N.B. Source Roles read only from Destination Files.
'      Destination Roles read only from Source Files.
'----------------------------------------------------------------
Private Sub CP_ReceiveFlag(LinkFile As String, _
                  Role As String, _
                  Flag As Byte)
    Dim Ext As String
    Dim Current As Byte
    If CP_Abort = True Then Exit Sub
    If Role = CP_Source Then Ext = "." + CP_Destination
    If Role = CP_Destination Then Ext = "." + CP_Source
    Do
        If Dir(LinkFile + Ext) < > " " Then
            Open LinkFile + Ext For Input Access Read Shared As #1
            On Error Resume Next
            Input #1, Current
            On Error GoTo 0
            Close #1
        End If
        DoEvents
    Loop While Current < > Flag And CP_Abort = False
End Sub
```

KMS Implementation

The following is commented source code for implementing the functionality of the present invention. The KMS Series Metrology Tools from Zygo Corporation, Laurel Brook Road Middlefield, Conn. equipment control package is used, however those skilled in the art recognize that the functionality is not limited to the specific code example illustrated herein. The procedures are complimentary to the Visual Basic example above and share similar names and calling sequences. This equipment control package does not have any communication capabilities except the ability to read and write ASCII text files. However, this capability allows the use of the present communication protocol to interface such a tool to high level automation software for equipment control and data exchange purposes.

```
//:------------------------------------------------------------
//: 300pc       V3.0
//:
//: KMS implementation of Communication Protocol for Data Exchange
//: via Shared Files.
//:
//: Input variables:
//:     V40         communication link to be used as data SOURCE
//:     V41         communication link to be used as data DESTINATION
//:
//: Working variables:
//:     V00, V01, V02, V03, V04
//:
//:------------------------------------------------------------
MARK: CP_INIT_SEND
  MATH: V03 = V40
  MATH: V04 = 0
  CALL: 1 CP_SEND_FLAG
RETURN:
//:------------------------------------------------------------
MARK: CP_INIT_RECEIVE
  MATH: V03 = V41
  MATH: V04 = 0
  CALL: 1 CP_SEND_FLAG
RETURN:
//:------------------------------------------------------------
MARK: CP_SEND_DATA
  MESSAGE: "Sending Data . . . "
  MATH: V03 = V40
  MATH: V04 = 1
  CALL: 1 CP_SEND_FLAG
  MATH: V03 = V40
  MATH: V04 = 1
  CALL: 1 CP_RECEIVE_FLAG
  MATH: V03 = V40
  MATH: V04 = 0
  CALL: 1 CP_SEND_FLAG
  MATH: V03 = V40
  MATH: V04 = 0
  CALL: 1 CP_RECEIVE_FLAG
  MESSAGE: "Done!"
RETURN:
//:------------------------------------------------------------
MARK: CP_WAIT_FOR_DATA
  MESSAGE: "Receiving Data . . . "
  MATH: V03 = V41
  MATH: V04 = 1
  CALL: 1 CP_RECEIVE_FLAG
RETURN:
//:------------------------------------------------------------
MARK: CP_RECEIVE_DATA
  MATH: V03 = V41
  MATH: V04 = 1
  CALL: 1 CP_SEND_FLAG
  MATH: V03 = V41
  MATH: V04 = 0
  CALL: 1 CP_RECEIVE_FLAG
  MATH: V03 = V41
  MATH: V04 = 0
  CALL: 1 CP_SEND_FLAG
  MESSAGE: "Done!"
RETURN:
//:------------------------------------------------------------
//: V03 -- communication link number (SOURCE or DESTINATION)
//: V04 -- the flag to be written (0 or 1)
//:
//: Source       -- writes to "*.0" files
//: Destination  -- writes to "*.1" files
//:------------------------------------------------------------
MARK: CP_SEND_FLAG
  MATH: V01 = V03 = V41
  MATRIXOPEN: V00 1 1 "D:\CPFF%.%", V03, V01
  MATRIXSET: V0 1 1 V04
  MATRIXWRITE: V00
  MATRIXCLOSE: V00
RETURN:
//:------------------------------------------------------------
//: V03 -- communication link number (0-9999)
//: V04 -- the flag to wait for (0 or 1)
//:
//: Source       -- reads from "*.1" files
//: Destination  -- reads from "*.0" files
//:------------------------------------------------------------
MARK: CP_RECEIVE_FLAG
  MATH: V01 = V03 = V40
 MARK: CP_RECEIVE_FLAG_LOOP
  MATRIXOPEN: V00 1 1 "D:\CPFF%.%", V03, V01
  MATRIXVALUE: V00 1 1 V02
  MATRIXCLOSE: V00
  MATH: V00 = V02!V04
 LOOP: V00 CP_RECEIVE_FLAG_LOOP
RETURN:
```

It will be appreciated by those skilled in the art that changes could be made to the embodiments described above without departing from the broad inventive concept thereof. It is understood, therefore, that this invention is not limited to the particular embodiments disclosed, but is intended to cover modifications within the spirit and scope of the present invention.

What is claimed is:

1. A computing system for exchanging data between a first computer application of the system and a second computer application of the system, comprising:

a computer application data file for receiving data from the first computer application;

a computer application send file for receiving notification when the computer application data file has received data from the first computer application;

a computer application read file for receiving notification when data has been read from the computer application data file by the second computer application, the first computer application monitoring the computer application read file for notification from the second computer application to initiate further writing to the computer application data file.

2. A computing system for exchanging data between computer applications of the system, comprising:

a computer application data file for each computer application for receiving data from a corresponding one of the computer applications;

a computer application send file corresponding to each computer application data file for receiving notification when the corresponding computer application data file has received data from the corresponding one of the computer applications;

a computer application read file corresponding to each computer application data file for receiving notification when data has been read from the corresponding computer application data file by a non-corresponding computer application, the corresponding computer application monitoring the computer application read file for notification to initiate further writing to the corresponding computer application data file.

3. A method of exchanging data between a first and second computer application of a computer system, comprising the steps of:

writing data of the first computer application to a first computer application data file;

notifying a first computer application send file when data has been written to the data file by the first computer application;

monitoring the first computer application send file from the second computer application for notification when data has been written to the first computer application data file by the first computer application;

reading the data of the first computer application data file from the second computer application upon detection of notification;

notifying a first computer application read file that data has been read by the second computer application from the first computer application data file; and monitoring the first computer application read file from the first computer application for notification that data has been read from to the first computer application data file by the second computer application to initiate further writing to the first computer application data file.

4. The method of exchanging data of claim 3, further comprising the step of:

initializing the contents of the first computer application read and send files prior to data exchange to enable overwriting of any content therein.

5. The method of exchanging data of claim 3, wherein the computer system is a network computer system.

6. The method of exchanging data of claim 3, wherein the computer system is a stand-alone computer system.

7. A method of exchanging bi-directional data between a first and second computer applications of a computer system, comprising the steps of:

writing data of the first computer application to a first computer application data file;

notifying a first computer application send file when data has been written to the first computer application data file by the first computer application;

monitoring the first computer application send file from the second computer application for notification that data has been written to the data file by the first computer application;

reading the data of the first computer application data file from the second computer application upon detection of notification;

notifying a first computer application read file when data has been read by the second computer application from the first computer application data file;

monitoring the first computer application read file from the first computer application for notification that data has been read from to the first computer application data file by the second computer application to initiate further writing to the first computer application data file;

writing data of the second computer application to a second computer application data file;

notifying a second computer application send file when data has been written to the second computer application data file by the second computer application;

monitoring the second computer application send file from the first computer application for notification that data has been written to the second computer application data file by the second computer application;

reading the data of the second computer application data file from the first computer application upon detection of notification;

notifying a second computer application read file when data has been read by the first computer application from the second computer application data file; and monitoring the second computer application read file from the second computer application for notification that data has been read from the second computer application data file by the first computer application to initiate further writing to the second computer application data file.

8. The method of exchanging data of claim 7, further comprising the step of:

initializing the contents of the shared read and send files prior to data exchange to enable overwriting of any content therein.

9. The method of exchanging data of claim 7, wherein the computer system is a network computer system.

10. The method of exchanging data of claim 7, wherein the computer system is a stand-alone computer system.

* * * * *